(12) United States Patent
Wiswesser et al.

(10) Patent No.: US 6,524,165 B1
(45) Date of Patent: Feb. 25, 2003

(54) METHOD AND APPARATUS FOR MEASURING SUBSTRATE LAYER THICKNESS DURING CHEMICAL MECHANICAL POLISHING

(75) Inventors: Andreas Norbert Wiswesser, Freiberg (DE); Walter Schoenleber, Holzgerlingen (DE); Boguslaw Swedek, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/695,002

(22) Filed: Oct. 23, 2000

Related U.S. Application Data

(62) Division of application No. 09/184,775, filed on Nov. 2, 1998, now Pat. No. 6,159,073.

(51) Int. Cl.⁷ .............................................. B24B 49/00
(52) U.S. Cl. .............................. 451/6; 451/8; 451/41; 451/288
(58) Field of Search .......................... 451/6, 8, 41, 287, 451/288

(56) References Cited

U.S. PATENT DOCUMENTS

| | | |
|---|---|---|
| 5,081,796 A | 1/1992 | Schultz |
| 5,357,331 A | 10/1994 | Flockencier |
| 5,413,941 A | 5/1995 | Koos et al. |
| 5,433,651 A | 7/1995 | Lustig et al. |
| 5,605,760 A | 2/1997 | Roberts |
| 5,640,242 A | 6/1997 | O'Boyle et al. |
| 5,658,183 A | 8/1997 | Sandhu et al. |
| 5,663,797 A | 9/1997 | Sandhu |
| 5,672,091 A | 9/1997 | Takahashi et al. |
| 5,708,506 A | 1/1998 | Birang |
| 5,730,642 A | 3/1998 | Sandhu et al. |
| 5,733,171 A | 3/1998 | Allen et al. |
| 5,762,537 A | 6/1998 | Sandhu et al. |
| 5,791,969 A | 8/1998 | Lund |
| 5,838,447 A | 11/1998 | Hiyama et al. |
| 5,851,135 A | 12/1998 | Sandhu et al. |
| 5,865,666 A | 2/1999 | Nagahara |
| 5,872,633 A | 2/1999 | Holzapfel et al. |
| 5,893,796 A | 4/1999 | Birang et al. |
| 5,899,792 A | 5/1999 | Yagi |
| 5,949,927 A | 9/1999 | Tang |
| 5,964,643 A | 10/1999 | Birang et al. |
| 6,004,187 A | 12/1999 | Nyui et al. |

FOREIGN PATENT DOCUMENTS

| | | |
|---|---|---|
| EP | 0 663 265 A1 | 7/1995 |
| EP | 0 738 561 A1 | 10/1996 |
| EP | 0 881 040 A2 | 12/1998 |
| EP | 0 881 484 A2 | 12/1998 |
| JP | 3-234467 | 10/1991 |

*Primary Examiner*—William Hong
(74) *Attorney, Agent, or Firm*—Fish & Richardson

(57) ABSTRACT

The thickness of a layer on a substrate is measured in-situ during chemical mechanical polishing. A light beam is divided through a window in a polishing pad, and the motion of the polishing pad relative to the substrate causes the light beam to move in a path across the substrate surface. An interference signal produced by the light beam reflecting off the substrate is monitored, and a plurality of intensity measurements are extracted from the interference signal. Each intensity measurement corresponds to a sampling zone in the path across the substrate surface. A radial position is determined for each sampling zone, and the intensity measurements are divided into a plurality of radial ranges according to the radial positions. The layer thickness is computed for each radial range from the intensity measurements associated with that radial range.

17 Claims, 9 Drawing Sheets

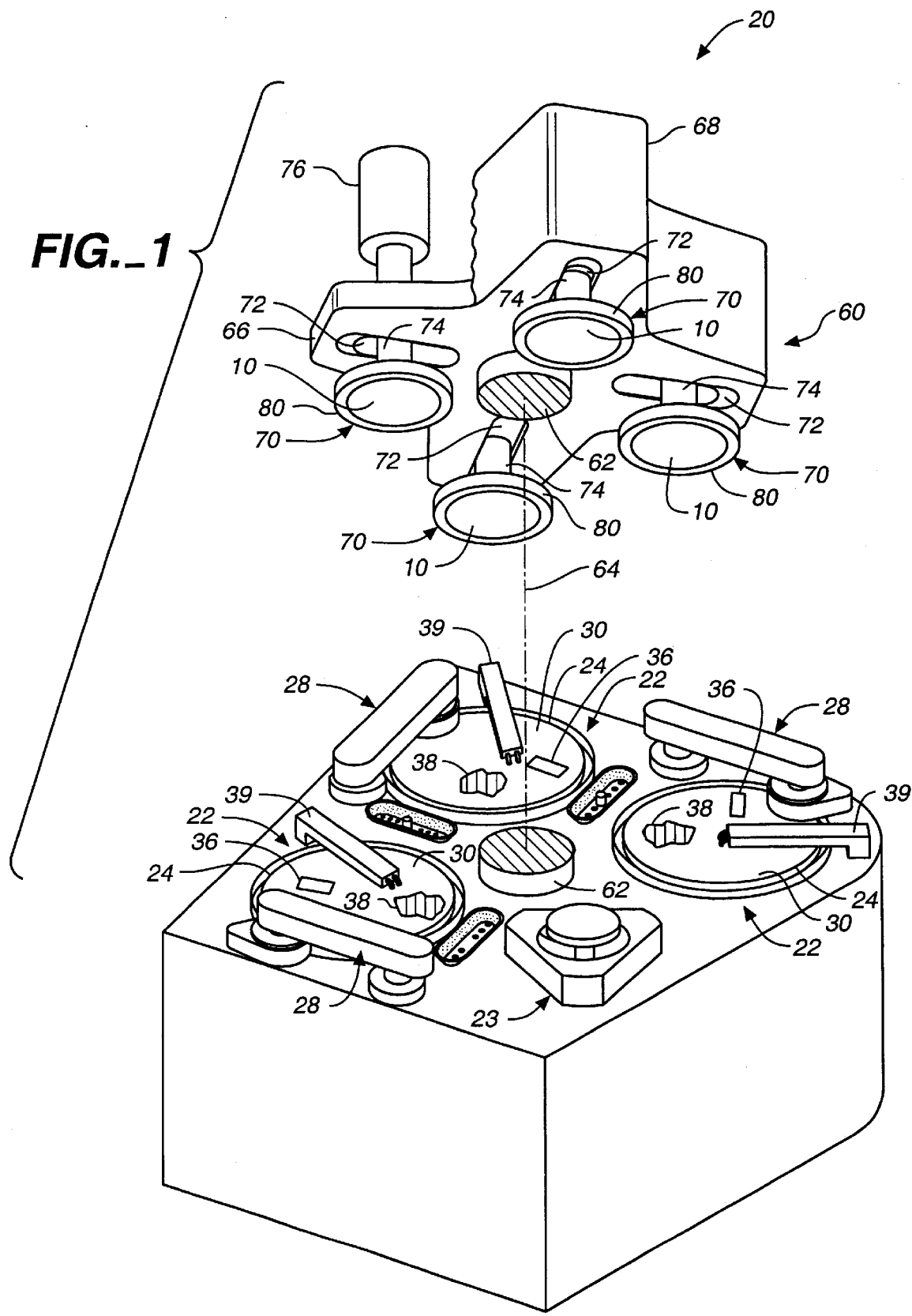

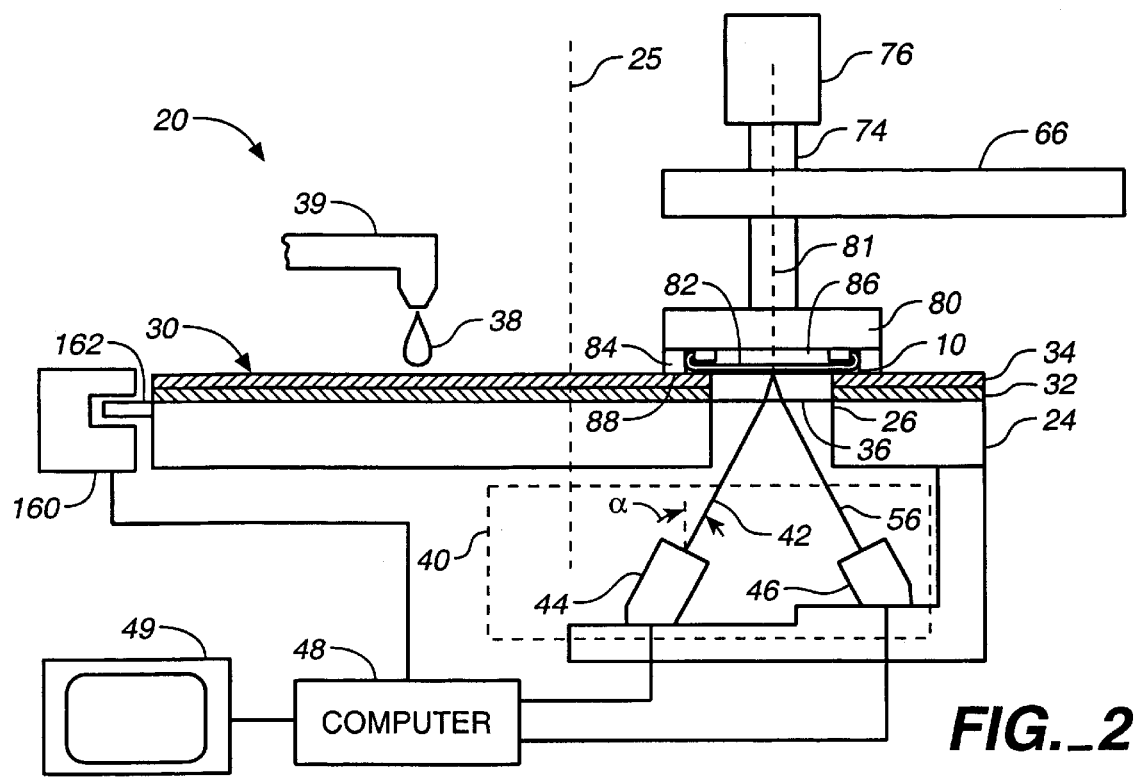
FIG._2
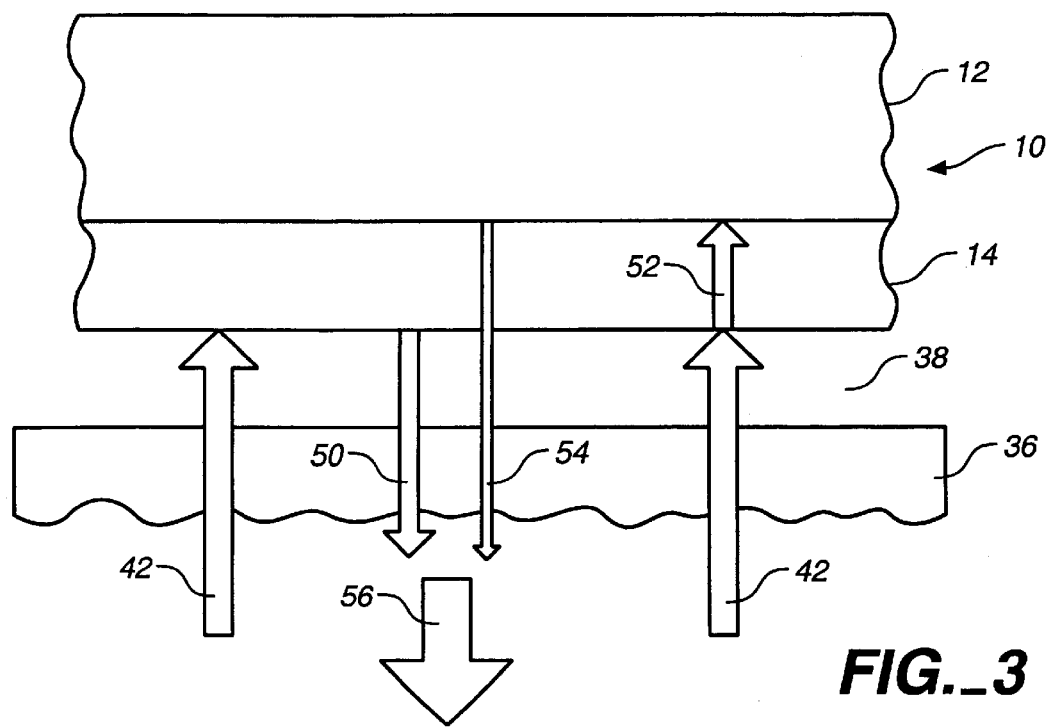
FIG._3

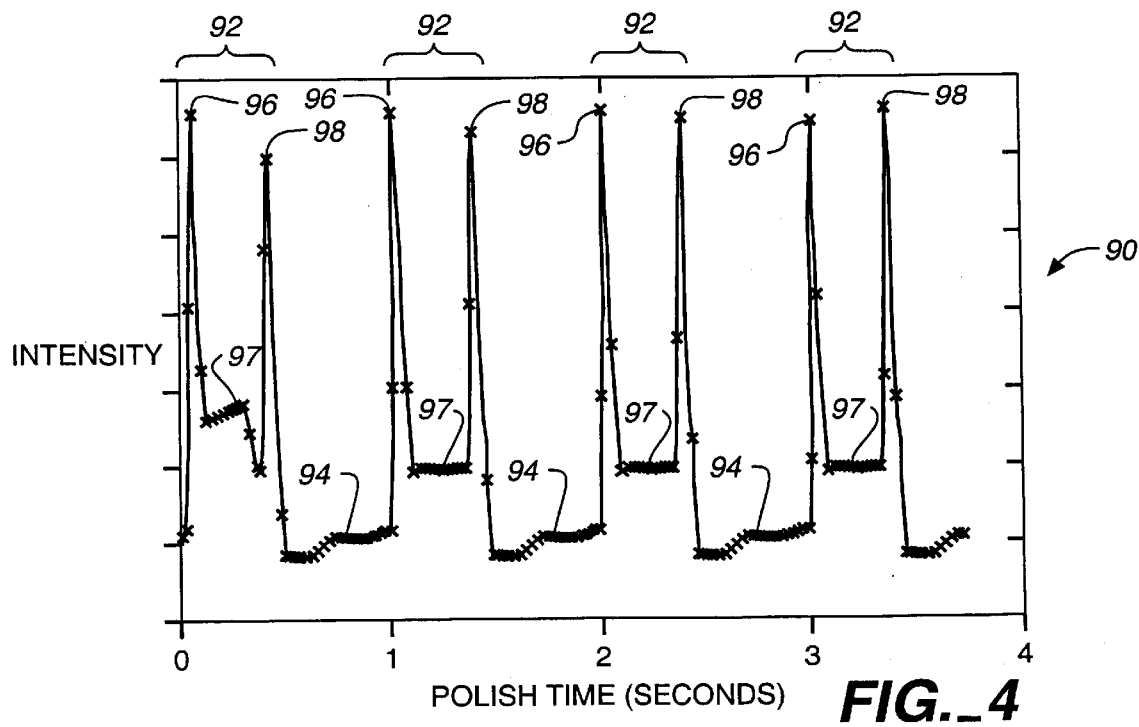
FIG._4
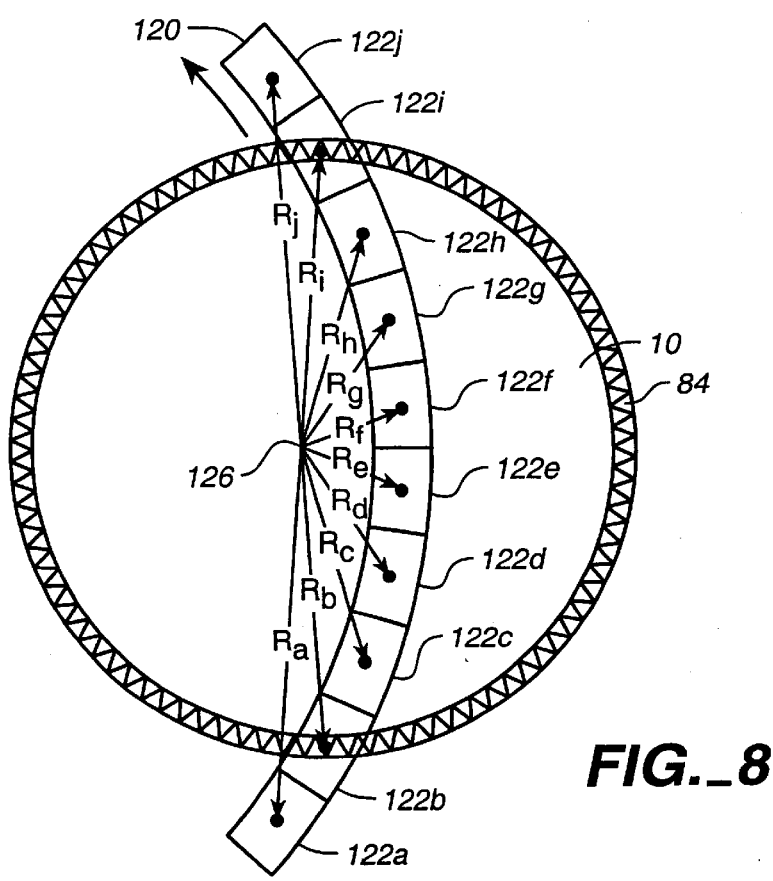
FIG._8

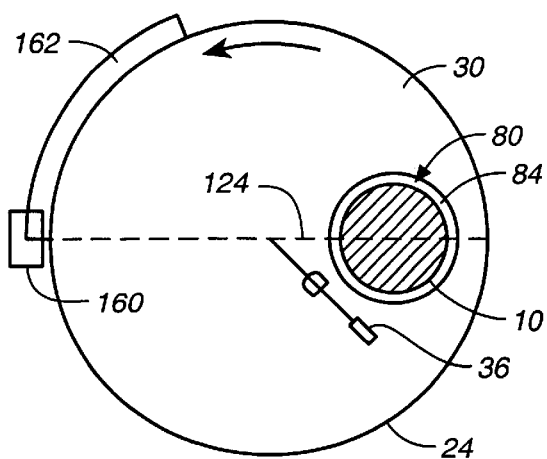
FIG._5A
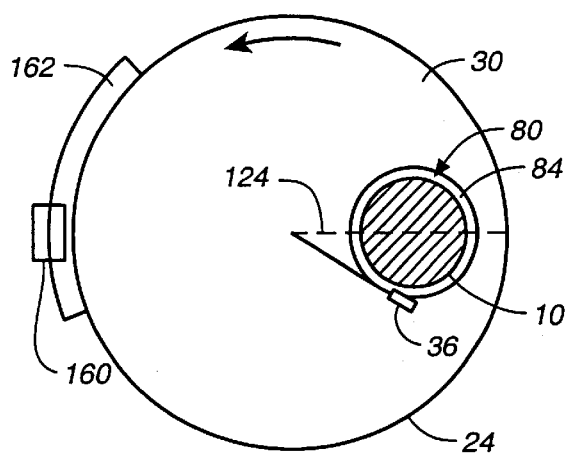
FIG._5B
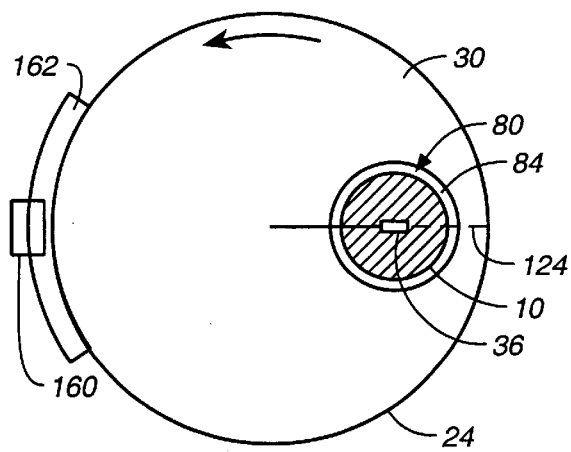
FIG._5C
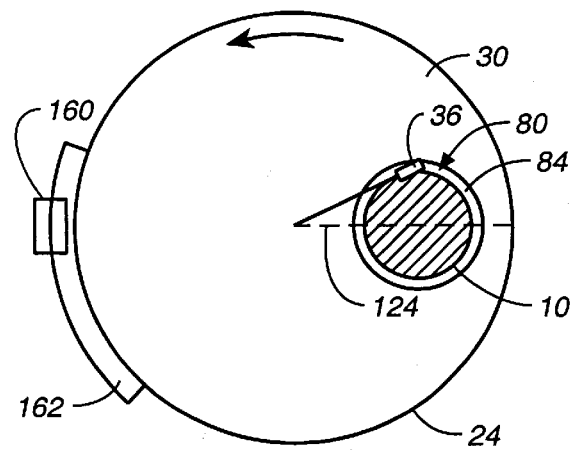
FIG._5D
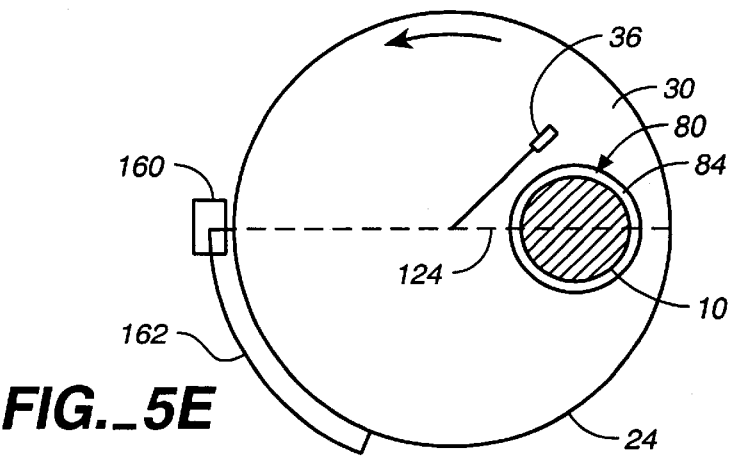
FIG._5E

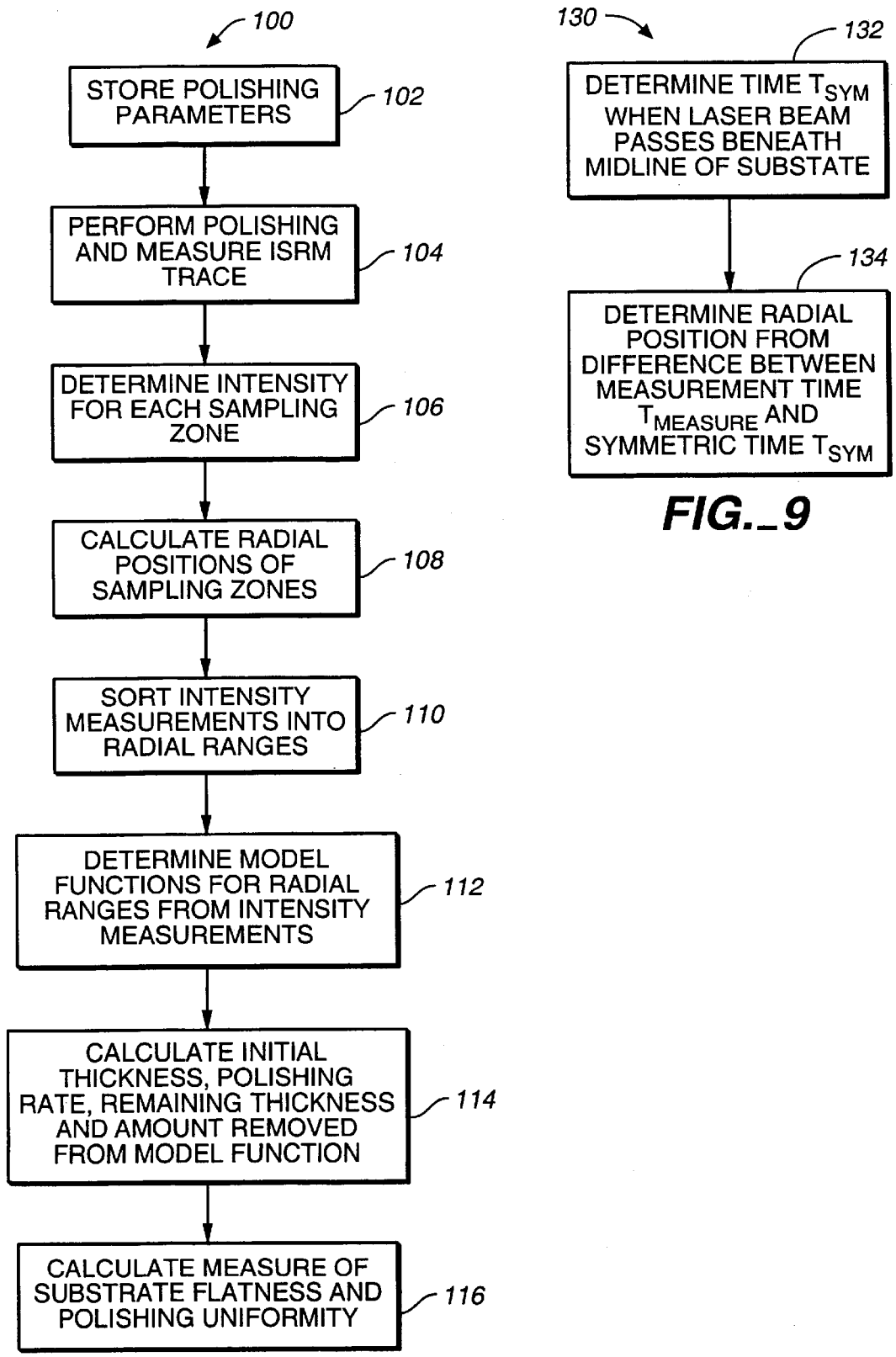

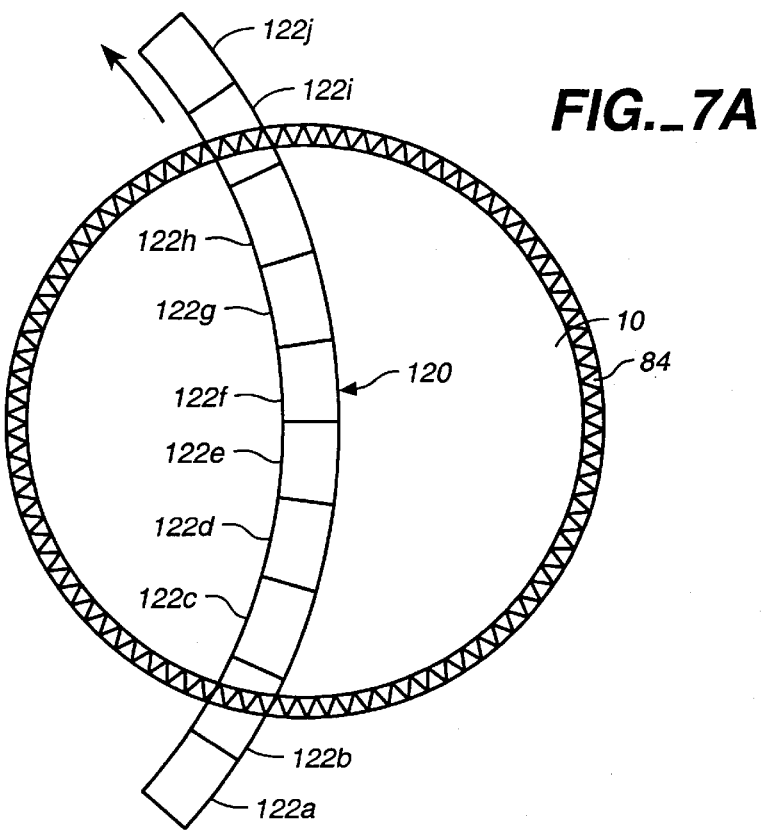
FIG._7A
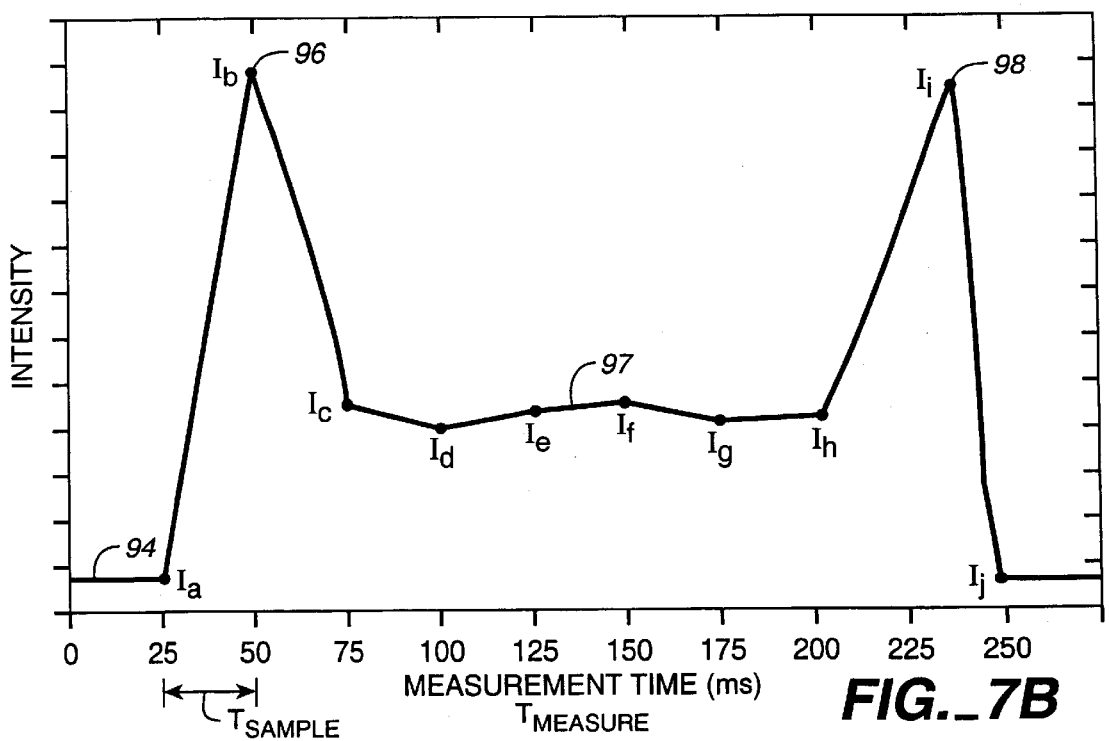
FIG._7B

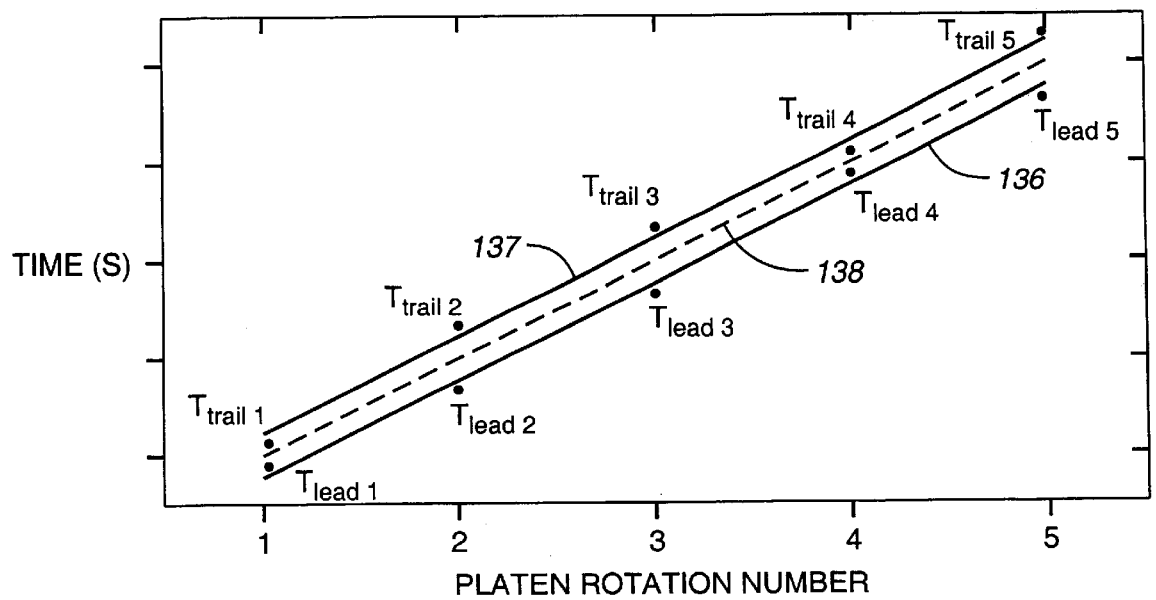
FIG._10
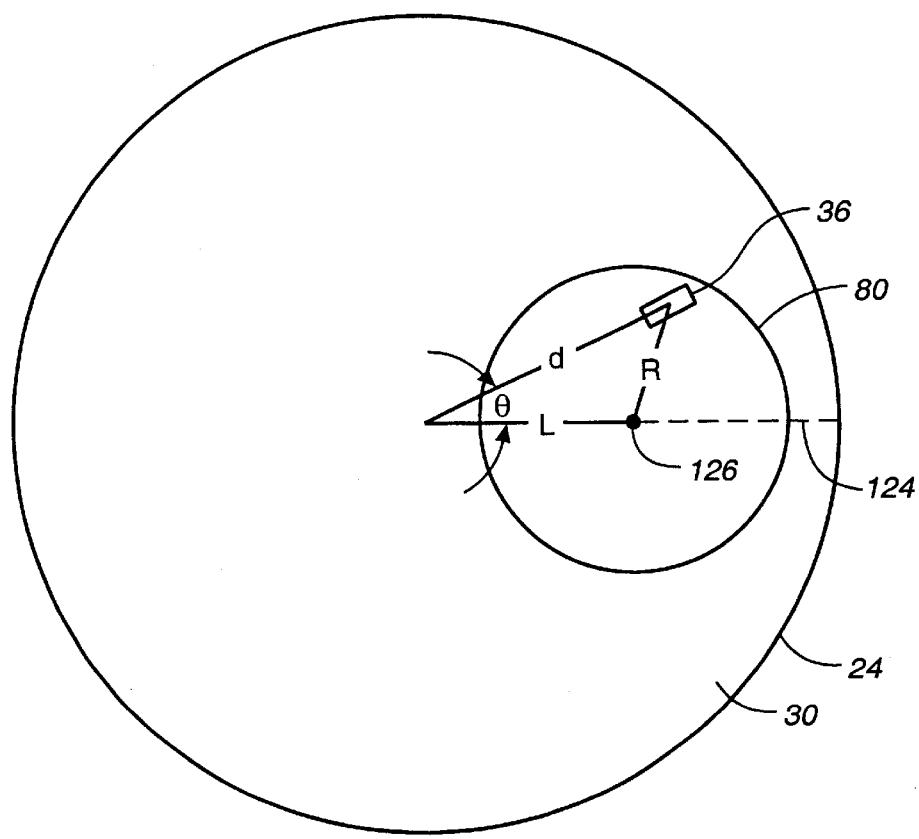
FIG._11

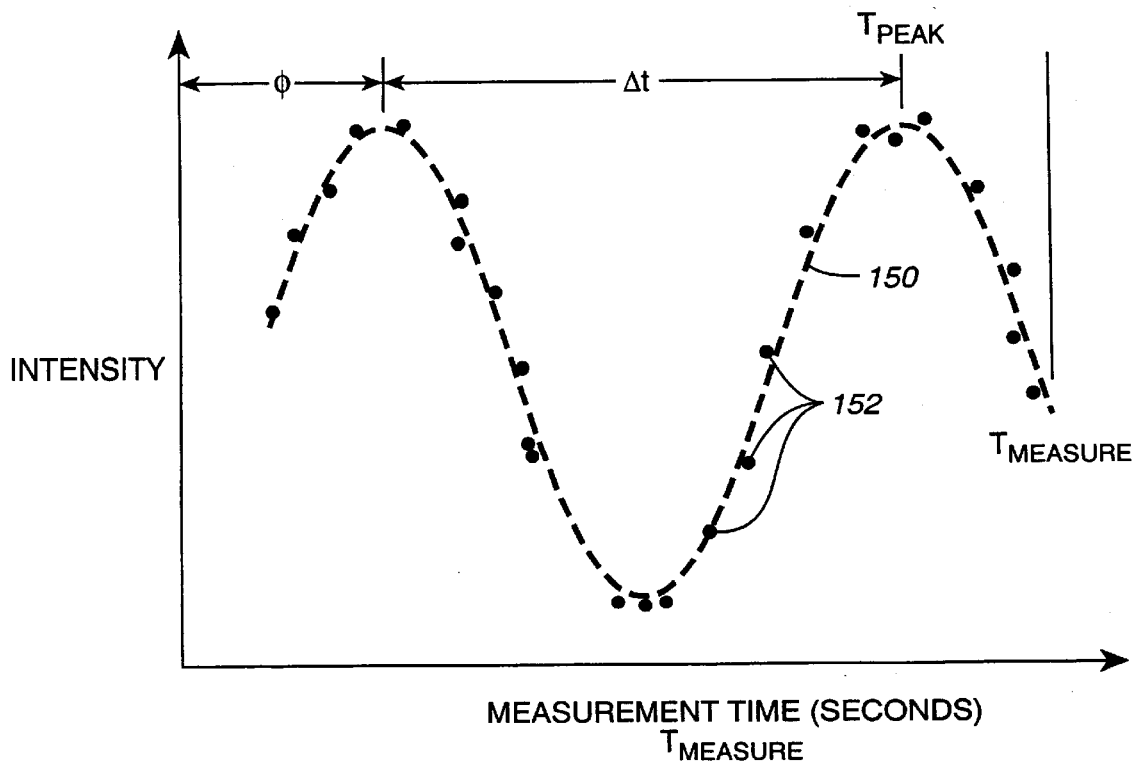
| 142 | Bin 1 | $I_1$ | $I_{15}$ | $I_{24}$ | .... |
|---|---|---|---|---|---|
|  |  | $t_1$ | $t_{15}$ | $t_{24}$ |  |
| 144 | Bin 2 | $I_2$ | $I_{17}$ | $I_{19}$ | .... |
|  |  | $t_2$ | $t_{17}$ | $t_{19}$ |  |
|  | Bin 3 | $I_3$ | $I_{12}$ |  |  |
|  |  | $t_3$ | $t_{12}$ |  |  |
*FIG._12*
*FIG._13*

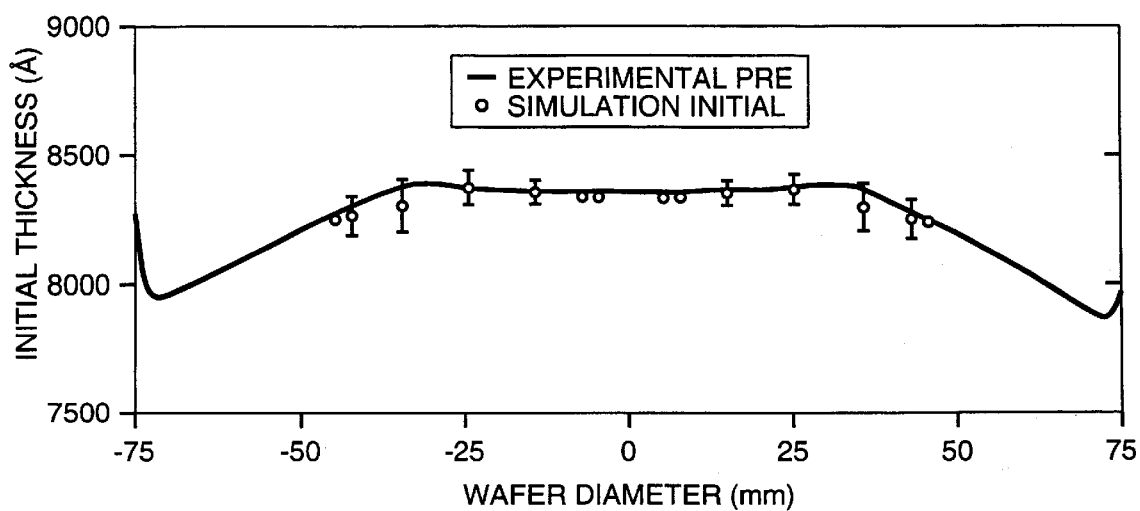
FIG._14A
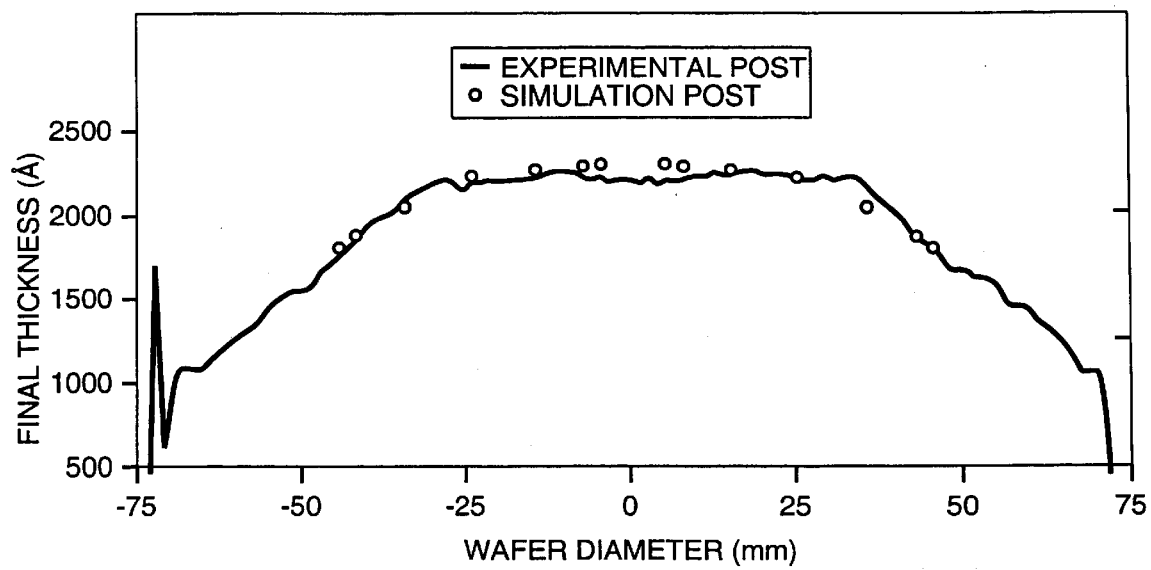
FIG._14B

METHOD AND APPARATUS FOR MEASURING SUBSTRATE LAYER THICKNESS DURING CHEMICAL MECHANICAL POLISHING

This application is a divisional and claims priority to application Ser. No. 09/184,775, filed Nov. 2, 1998 now U.S. Pat. No. 6,159,073.

BACKGROUND

The present invention relates generally to chemical mechanical polishing of substrates, and more particularly to methods and apparatus for measuring the thickness of a substrate layer during chemical mechanical polishing.

An integrated circuit is typically formed on a substrate by the sequential deposition of conductive, semiconductive or insulative layers on a silicon wafer. After each layer is deposited, the layer is etched to create circuitry features. As a series of layers are sequentially deposited and etched, the outer or uppermost surface of the substrate, i.e., the exposed surface of the substrate, becomes increasingly non-planar. This non-planar surface presents problems in the photolithographic steps of the integrated circuit fabrication process. Therefore, there is a need to periodically planarize the substrate surface.

Chemical mechanical polishing (CMP) is one accepted method of planarization. This planarization method typically requires that the substrate be mounted on a carrier or polishing head. The exposed surface of the substrate is placed against a rotating polishing pad. The polishing pad may be either a "standard" pad or a fixed-abrasive pad. A standard pad has a durable roughened surface, whereas a fixed-abrasive pad has abrasive particles held in a containment media. The carrier head provides a controllable load, i.e., pressure, on the substrate to push it against the polishing pad. A polishing slurry, including at least one chemically-reactive agent, and abrasive particles if a standard pad is used, is supplied to the surface of the polishing pad.

The effectiveness of a CMP process may be measured by its polishing rate, and by the resulting finish (absence of small-scale roughness) and flatness (absence of large-scale topography) of the substrate surface. The polishing rate, finish and flatness are determined by the pad and slurry combination, the carrier head configuration, the relative speed between the substrate and pad, and the force pressing the substrate against the pad.

In order to determine the effectiveness of different polishing tools and processes, a so-called "blank" wafer, i.e., a wafer with multiple layers but no pattern, is polished in a tool/process qualification step. After polishing, the remaining layer thickness is measured at several points on the substrate surface. The variation in layer thickness provide a measure of the wafer surface uniformity, and a measure of the relative polishing rates in different regions of the substrate. One approach to determining the substrate layer thickness and polishing uniformity is to remove the substrate from the polishing apparatus and examine it. For example, the substrate may be transferred to a metrology station where the thickness of the substrate layer is measured, e.g., with an ellipsometer. Unfortunately, this process can be time-consuming and thus costly, and the metrology equipment is costly.

One problem in CMP is determining whether the polishing process is complete, i.e., whether a substrate layer has been planarized to a desired flatness or thickness. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the polishing endpoint. Therefore, the polishing endpoint cannot be determined merely as a function of polishing time.

One way to determine the polishing endpoint is to remove the substrate from the polishing surface and examine it. For example, the substrate may be transferred to a metrology station where the thickness of a substrate layer is measured, e.g., with an ellipsometer. If the desired specifications are not met, the substrate is reloaded into the CMP apparatus for further processing. This is a time consuming procedure that reduces the throughput of the CMP apparatus. Alternatively, the examination might reveal that an excessive amount of material has been removed, rendering the substrate unusable.

There is, therefore, a need for a method of measuring in situ the thickness and flatness of the substrate layer, and detecting whether the desired thickness or flatness has been achieved.

Several methods have been developed for in-situ polishing endpoint detection. Most of these methods involve monitoring a parameter associated with the substrate surface, and indicating an endpoint when the parameter abruptly changes. For example, where an insulative or dielectric layer is being polished to expose an underlying metal layer, the coefficient of friction and the reflectivity of the substrate will change abruptly when the metal layer is exposed.

Where the monitored parameter changes abruptly at the polishing endpoint, such endpoint detection methods are acceptable. However, as the substrate is being polished, the polishing pad condition and the slurry composition at the pad-substrate interface may change. Such changes may mask the exposure of an underlying layer, or they may imitate an endpoint condition. Additionally, such endpoint detection methods will not work if only planarization is being performed, if the underlying layer is to be over-polished, or if the underlying layer and the overlying layer have similar physical properties.

SUMMARY

In general, in one aspect, the invention features a method of measuring a characteristic of a layer on a substrate during chemical mechanical polishing. A surface of the substrate is brought into contact with a polishing pad that has a window. Relative motion is created between the substrate and the polishing pad. A light beam is divided through the window, and the motion of the polishing pad relative to the substrate causes the light beam to move in a path across the substrate surface. An interference signal produced by the light beam reflecting off the substrate is monitored, and a plurality of intensity measurements are extracted from the interference signal. Each intensity measurement corresponds to a sampling zone in the path across the substrate surface. A radial position is determined for each sampling zone, and the intensity measurements are divided into a plurality of radial ranges according to the radial positions. The characteristic is computed for each radial range from the intensity measurements associated with that radial range.

Implementation of the invention may include one or more of the following features. The characteristic may be a polishing rate, an initial thickness of the substrate layer, a remaining thickness, or a difference between the initial thickness and the remaining thickness of the substrate layer. A measure of polishing uniformity may be calculated from the measured characteristic in each radial range. A model function, such as a sinusoidal function, may be determined for each radial range. The sinusoidal function may be described by a period and a phase offset, in which may be computed from a least square fit of the model function to the intensity measurements in the associated radial range. The intensity measurements may be extracted by integrating the interference signal over a series of sampling times. Each sampling zone may correspond to a portion of the substrate across which the light beam travels during a corresponding sampling time. A time when the window crosses a midline of the substrate may be determined, and a position of the polishing pad may be determined from a difference between a measurement time and the time when the window crosses the midline of the substrate. The substrate may be positioned on the polishing pad by a carrier head having a retaining ring, and the time that the window crosses the midline of the substrate and may be determined from a first time and a second time when the window passes beneath the retaining ring. Determining the time the window crosses the midline of the substrate may be determined from a signal from a position sensor which monitors the position of the polishing pad. The radial position may be determined from a head sweep profile. Intensity measurements from sampling zones having radial positions greater than a predetermined radius may be discarded. The polishing pad may be located on a platen, and the platen may be rotated to create the relative motion between the substrate and the polishing pad. The light source, e.g., a laser, may be connected to and may rotate with the platen.

In another aspect, the invention is directed to a method of measuring a characteristic of a layer on a substrate during chemical mechanical polishing. A surface of the substrate is contacted with a polishing pad, and a light beam is directed through a window in the polishing pad onto the substrate. The light beam moves in a path across the substrate surface. A plurality of intensity measurements are produced by the reflection of the light beam from the substrate. The intensity measurements are divided into a plurality of radial zones according to the radial position of the light beam on the substrate during the intensity measurement, and the characteristic is computed for each radial zone from the intensity measurements associated with that radial zone.

In another aspect, the invention is directed to a chemical mechanical polishing apparatus. The apparatus includes a movable polishing surface that has a window and, a carrier head for holding a substrate having a layer thereon in contact with the polishing pad. A light source directs a light beam through the window, and the motion of the polishing pad relative to the substrate causes the light beam to move in a path across the substrate surface. A detector monitors an interference signal produced by the light beam reflecting off the substrate. A computer is configured to extract a plurality of intensity measurements from the interference signal, determine a radial position for a sampling zone corresponding to each intensity measurement, divide the intensity measurements into a plurality of radial ranges according to the radial positions, and compute a characteristic of the substrate layer for each radial range from the intensity measurements associated with that radial range.

Implementation of the invention may include the following. The carrier head may include a retaining ring with a reflective lower surface. A position sensor may monitor the position of the polishing pad and the carrier head.

Advantages of the invention may include one or more of the following. The thickness of a substrate layer on a blank wafer may be measured in-situ at a plurality of radial positions in order to generate a measure of the polishing uniformity to characterize the effectiveness of the CMP tool and process. The thickness measurements may be used to determine the endpoint criteria or to adjust polishing parameters to improve polishing uniformity. The thickness measurements may also be performed when polishing a device wafer to detect the polishing endpoint.

Other features and advantages of the invention will become apparent from the following description, including the drawings and claims.

BRIEF DESCRIPTION OF THE DRAWINGS

FIG. 1 is an exploded perspective view of a chemical mechanical polishing apparatus.

FIG. 2 is a side view of a chemical mechanical polishing apparatus including an optical interferometer.

FIG. 3 is a simplified cross-sectional view of a substrate being processed, schematically showing a laser beam impinging on and reflecting from the substrate.

FIG. 4 is a graph showing a measured reflectance trace (in arbitrary intensity units).

FIGS. 5A–5E are simplified plan views illustrating the position of a window in a polishing pad as a platen rotates.

FIG. 6 is a flow chart of a method of determining the thickness of a thin film layer during CMP.

FIG. 7A is a schematic view illustrating the path of a laser beneath the carrier head.

FIG. 7B is a graph showing a hypothetical portion of a reflectance trace generated by a single sweep of the window beneath the carrier head.

FIG. 8 is a schematic view illustrating the radial positions of sampling zones from the path of the laser.

FIG. 9 is a flow chart of a method of determining the radial position of a sampling zone.

FIG. 10 is a graph showing the time at which the laser beam passes beneath a retaining ring of a carrier head as a function of the number of rotations of the platen.

FIG. 11 is a schematic view illustrating the calculation of the radial position of the sampling zones.

FIG. 12 is a schematic diagram of a data structure to store intensity measurements.

FIG. 13 is a graph illustrating hypothetical intensity measurements for sampling zones in a particular radial range as a function of time, and a model function calculated from the intensity measurements.

FIGS. 14A and 14B are graphs showing the initial and final thickness, respectively, of a thin film layer as a function of distance from the center of the substrate.

DETAILED DESCRIPTION

Referring to FIGS. 1 and 2, one or more substrates 10 will be polished by a chemical mechanical polishing (CMP) apparatus 20. A description of a similar polishing apparatus 20 may be found in U.S. Pat. No. 5,738,574, the entire disclosure of which is incorporated herein by reference. Polishing apparatus 20 includes a series of polishing stations 22 and a transfer station 23. Transfer station 23 serves multiple functions, including receiving individual substrates 10 from a loading apparatus (not shown), washing the substrates, loading the substrates into carrier heads, receiving the substrates from the carrier heads, washing the substrates again, and finally, transferring the substrates back to the loading apparatus.

Each polishing station includes a rotatable platen 24 on which is placed a polishing pad 30. The first and second stations may include a two-layer polishing pad with a hard durable outer surface, whereas the final polishing station may include a relatively soft pad. If substrate 10 is an "eight-inch" (200 millimeter) or "twelve-inch" (300 millimeter) diameter disk, then the platens and polishing pads will be about twenty inches or thirty inches in diameter, respectively. Each platen 24 may be connected to a platen drive motor (not shown). For most polishing processes, the platen drive motor rotates platen 24 at thirty to two hundred revolutions per minute, although lower or higher rotational speeds may be used. Each polishing station may also include a pad conditioner apparatus 28 to maintain the condition of the polishing pad so that it will effectively polish substrates.

Polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 may be composed of an open cell foamed polyurethane or a sheet of polyurethane with a grooved surface. Backing layer 32 may be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

A rotatable multi-head carousel 60 is supported by a center post 62 and is rotated thereon about a carousel axis 64 by a carousel motor assembly (not shown). Center post 62 supports a carousel support plate 66 and a cover 68. Carousel 60 includes four carrier head systems 70. Center post 62 allows the carousel motor to rotate carousel support plate 66 and to orbit the carrier head systems and the substrates attached thereto about carousel axis 64. Three of the carrier head systems receive and hold substrates, and polish them by pressing them against the polishing pads. Meanwhile, one of the carrier head systems receives a substrate from and delivers a substrate to transfer station 23.

Each carrier head system includes a carrier or carrier head 80. A carrier drive shaft 74 connects a carrier head rotation motor 76 (shown by the removal of one quarter of cover 68) to each carrier head 80 so that each carrier head can independently rotate about it own axis. There is one carrier drive shaft and motor for each head. In addition, each carrier head 80 independently laterally oscillates in a radial slot 72 formed in carousel support plate 66. A slider (not shown) supports each drive shaft in its associated radial slot. A radial drive motor (not shown) may move the slider to laterally oscillate the carrier head.

The carrier head 80 performs several mechanical functions. Generally, the carrier head holds the substrate against the polishing pad, evenly distributes a downward pressure across the back surface of the substrate, transfers torque from the drive shaft to the substrate, and ensures that the substrate does not slip out from beneath the carrier head during polishing operations.

Carrier head 80 may include a flexible membrane 82 that provides a mounting surface for substrate 10, and a retaining ring 84 to retain the substrate beneath the mounting surface. Pressurization of a chamber 86 defined by flexible membrane 82 forces the substrate against the polishing pad. Retaining ring 84 may be formed of a highly reflective material, or it may be coated with a reflective layer to provide it with a reflective lower surface 88. A description of a similar carrier head 80 may be found in U.S. patent application Ser. No. 08/745,679, entitled a CARRIER HEAD WITH a FLEXIBLE MEMBRANE FOR a CHEMICAL MECHANICAL POLISHING SYSTEM, filed Nov. 8, 1996, by Steven M. Zuniga et al., assigned to the assignee of the present invention, the entire disclosure of which is incorporated herein by reference.

A slurry 38 containing a reactive agent (e.g., deionized water for oxide polishing) and a chemically-reactive catalyzer (e.g., potassium hydroxide for oxide polishing) may be supplied to the surface of polishing pad 30 by a slurry supply port or combined slurry/rinse arm 39. If polishing pad 30 is a standard pad, slurry 38 may also include abrasive particles (e.g., silicon dioxide for oxide polishing).

In operation, the platen is rotated about its central axis 25, and the carrier head is rotated about its central axis 81 and translated laterally across the surface of the polishing pad.

A hole 26 is formed in platen 24 and a transparent window 36 is formed in a portion of polishing pad 30 overlying the hole. Transparent window 36 may be constructed as described in U.S. patent application Ser. No. 08/689,930, entitled METHOD OF FORMING A TRANSPARENT WINDOW IN A POLISHING PAD FOR A CHEMICAL MECHANICAL POLISHING APPARATUS by Manoocher Birang, et al., filed Aug. 26, 1996, and assigned to the assignee of the present invention, the entire disclosure of which is incorporated herein by reference. Hole 26 and transparent window 36 are positioned such that they have a view of substrate 10 during a portion of the platen's rotation, regardless of the translational position of the carrier head.

An interferometer 40, e.g., a laser interferometer, is secured to platen 24 generally beneath hole 26 and rotates with the platen. The interferometer includes a light source 44 and a detector 46. The light source generates a light beam 42 which propagates through transparent window 36 and slurry 38 (see FIG. 3) to impinge upon the exposed surface of substrate 10. For example, the light source 44 may be laser and the light beam 42 may be a collimated laser beam. The light laser beam 42 is projected from laser 44 at an angle a from an axis normal to the surface of substrate 10, i.e., at an angle a from axes 25 and 81. In addition, if the hole 26 and window 36 are elongated, an beam expander (not illustrated) may be positioned in the path of the light beam to expand the light beam along the elongated axis of the window.

Laser 44 may operate continuously. Alternately, the laser may be activated to generate laser beam 42 during a time when hole 26 is generally adjacent substrate 10. Referring to FIGS. 2 and 5A–5E, CMP apparatus 20 may include a position sensor 160, such as an optical interrupter, to sense when window 36 is near the substrate. For example, the optical interrupter could be mounted at a fixed point opposite carrier head 80. A flag 162 is attached to the periphery of the platen. The point of attachment and length of flag 162 is selected so that it interrupts the optical signal of sensor 160 from a time shortly before window 36 sweeps beneath carrier head 80 to a time shortly thereafter. The output signal from detector 46 may be measured and stored while the optical signal of sensor 160 is interrupted.

For compatibility with the endpoint detection techniques discussed in U.S. patent application Ser. No. 08/689,930, the flag 162 may have regions of differing widths, and position sensor 160 could have multiple optical interrupters. One interrupter would be used for process characterization using monitor wafers discussed below, and the other interrupter would be used for endpoint detection during polishing of product wafer.

In operation, CMP apparatus 20 uses laser interferometer 40 to determine the amount of material removed from the surface of the substrate, or to determine when the surface has become planarized. A general purpose programmable digital computer 48 may be connected to laser 44, detector 46 and sensor 160. Computer 48 may be programmed to activate the laser when the substrate generally overlies the window, to store intensity measurements from the detector, to display the intensity measurements on an output device 49, to calculate the initial thickness, polishing rate, amount removed and remaining thickness from the intensity measurements, and to detect the polishing endpoint.

Referring to FIG. 3, a "blank" substrate 10 includes a silicon wafer 12 and an overlying transparent or semitransparent thin film layer 14, such as. an oxide or nitride layer. Other layers may be interposed between thin film layer 14 and wafer 12. The portion of laser beam 42 which impinges on substrate 10 will be partially reflected at the surface of thin film layer 14 to form a first reflected beam 50. However, a portion of the light will also be transmitted through thin film layer 14 to form a transmitted beam 52 which impinges on the underlying wafer 12. At least some of the light reaching wafer 12 from transmitted beam 52 will be reflected back through thin film layer 14 to form a second reflected beam 54. The first and second reflected beams 50, 54 interfere with each other constructively or destructively depending on their phase relationship, to form a resultant beam 56. The phase relationship of the reflected beams is primarily a function of the index of refraction and thickness of thin film layer 14, the wavelength of laser beam 42, and the angle α of incidence.

Although substrate 10 could have just a single thin film layer, this interference process is generally applicable to substrates with multi-layer structures. If each layer is. partially reflective and partially transmissive, a resultant interference beam will be created, although it will be a combination of the reflected beams from all the layers and the wafer.

The resultant beam 56 propagates back through slurry 38 and transparent window 36 to detector 46. If the reflected beams are in phase with each other, the detector generates a maxima intensity signal. On the other hand, if the reflected beams are out of phase, the detector produces a minima intensity signal. Other phase relationships will result in an interference signal between the maxima and minima signals. The result is a signal output from detector 46 that varies with the thickness of the thin film layer or layers.

Because the thickness of the thin film layer varies with time as the substrate is polished, the signal output from detector 46 also varies with time. The time varying output of detector 46 may be referred to as an in-situ reflectance measurement trace (or more simply, a reflectance trace). As discussed below, this reflectance trace may be used to determine the thickness of the substrate layers.

Referring to FIG. 4, a measured reflectance trace 90 was generated by polishing a blank oxide-coated wafer. Polishing was conducted at a platen rotation rate of sixty-three rpm, a carrier head rotation rate of sixty-three rpm, and without linear sweeping of the carrier head. As shown, reflectance trace 90 includes a series of peaks 92 separated by valleys 94. Each peak 92 includes a sharp leading spike 96, a sharp trailing spike 98, and a plateau region 97 located between leading spike 96 and trailing spike 98.

Referring to FIGS. 4 and 5A–5E, the large scale structure of reflectance trace 90 can be explained by reference to the angular position of platen 24. Initially, window 36 does not have view of the substrate (see FIG. 5A). Consequently, laser beam 42 is not reflected and the intensity measured by detector 46 is a result of background intensity, including reflection from slurry 38 and transparent window 36. This low intensity corresponds to a valley 94. As platen 24 rotates, window 36 first sweeps underneath retaining ring 84 of carrier head 80 (see FIG. 5B). The highly reflective lower surface 88 of retaining ring 84 reflects a relatively large portion of laser beam 42 into detector 46, creating a large intensity measurement that corresponds to leading spike 96. As window 36 sweeps beneath substrate 10 (see FIG. 5C) a portion of laser beam 42 is reflected by the substrate. This intensity measurement will depend upon the interference between first and second reflected beams 50, 54 as discussed above. In general, substrate 10 will have an intermediate reflectivity, resulting in plateau region 97 on reflectance trace 90. As the platen continues to rotate, window 36 passes again beneath retaining ring 84 (see FIG. 5D), thereby generating trailing spike 98. Finally, window 36 sweeps out from beneath carrier head 80 (see FIG. 5E), and the detector measures a low intensity that corresponds to the valley following trailing spike 98.

Referring to FIG. 6, computer 48 of CMP apparatus 20 may use the reflectance trace generated by laser interferometer 40 to perform an in-situ measurement method 100 to determine the initial thickness of thin film layer 14, the polishing rate, the amount of material removed, and the remaining thickness of the thin film layer. Each measurement may be performed at a plurality of radial positions. In addition, computer 48 may use the thickness measurements to determine the flatness of the substrate and the polishing uniformity for CMP tool and process qualification.

First, several polishing parameters that will be used during the in-situ thickness determination are stored in the memory of computer 48 (step 102). The polishing parameters of interest include the platen rotation rate and the carrier head sweep profile. In addition, an approximate initial thickness $T_{approx}$ (as provided by the wafer supplier or deduced from layer deposition process parameters) of the thin film layer may be stored in computer 48.

A substrate is polished, and a reflectance trace is generated with interferometer 40 (step 104). For process and tool qualification, the substrate will be a blank substrate. The initial thickness, polishing rate, remaining thickness and amount removed may be calculated from reflectance trace 90 during or after polishing.

In brief, each time window 36 passes beneath carrier head 80, laser interferometer 40 measures the intensity of reflected radiation from a plurality of sampling zones (step 106). The radial position of each sampling zone is calculated (step 108), and the intensity measurements are sorted into radial ranges (step 110). Once a sufficient number of intensity measurements have been accumulated for a particular radial range, a model function is calculated from the intensity measurements for that range (step 112). The model function is used to calculate the initial thickness, polishing rate, remaining thickness, and amount removed (step 114). In addition, a measure of the substrate flatness can be calculated from the measurements made in step 114 (step 116). Each of these steps will be discussed in greater detail below.

Referring to FIGS. 7A and 7B, the combined rotation of the platen and the linear sweep of the carrier head causes window 36 (and thus laser beam 42) to sweep across the bottom surface of carrier head 80 and substrate 10 in a sweep path 120. As the laser beam sweeps across the substrate, laser interferometer 40 integrates the measured intensity over a sampling period, $T_{sample}$, to generate a series of individual intensity measurements $I_a, I_b, \ldots, I_j$. The sample rate F (the rate at which intensity measurements are generated) of laser interferometer 40 is given by $F=1/T_{sample}$. Laser interferometer 40 may have a sample rate between about 10 and 1000 Hertz (Hz), corresponding to a sampling period between about 2.5 and 100 milliseconds. Specifically, laser interferometer 40 may have a sampling rate of about 40 Hz and a sampling period of about 25 milliseconds.

Thus, each time that laser 44 is activated, laser interferometer 40 measures the intensity from a plurality of sampling zones 122a–122j. Each sampling zone corresponds to the area of the substrate over which the laser beam sweeps during corresponding sampling period. In summary, in step 106 laser interferometer 40 generates a series of intensity measurements $I_a, I_b, \ldots, I_j$ corresponding to sampling zones 122a, 122b, ..., 122j.

Although FIG. 7A illustrates ten sampling zones, there could be more or fewer zones, depending on the platen rotation rate and the sampling rate. Specifically, a lower sampling rate will result in fewer, wider sampling zones, whereas a higher sampling rate will result in a greater number of narrower sampling zones. Similarly, a lower rotation rate will result in a larger number of narrower sampling zones, whereas a higher rotation rate will result in a lower number of wider sampling zones. In addition, multiple detectors could be used to provide more sampling zones.

As shown in FIG. 7B, the intensity measurements $I_a$ and $I_j$ for sampling zones 122a and 122j, respectively, are low because window 36 does not have a view of the carrier head, and consequently laser beam 42 is not reflected. Sampling 122b and 122i are located beneath retaining ring 84, and therefore intensity measurements $I_b$ and $I_i$ will be relatively large. Sampling zones 122c, 122d, ..., 122h are located beneath the substrate, and consequently generate intensity measurements $I_c, I_d, \ldots, I_h$ of intermediate intensity at a variety of different radial positions across the substrate. These intensity measurements depend upon the thickness of thin film layer 14.

Referring to FIG. 8, in step 108 the radial positions $R_a, R_b, \ldots, R_j$ of the corresponding sampling zones 122a, 122b, ..., 122j are determined. One way to determine the radial position of a sampling zone is to calculate the position of the laser beneath the substrate based on the measurement time $T_{measure}$ and the platen rotation rate and carrier head sweep profile. Unfortunately, the actual platen rotation rate and carrier head sweep profile may not precisely match the polishing parameters. Therefore, a preferred method 130 of determining the radial positions of the sampling zones is shown in FIG. 9. First, the time $T_{sym}$ at which laser beam 42 passes beneath a mid-line 124 (see FIG. 5C) of the substrate is determined (step 132). Then the radial positions of the sampling zones are determined from the time difference between the measurement time $T_{measure}$ and the symmetric time $T_{sym}$ (step 134).

One method of determining the symmetry time $T_{sym}$ is to average the individual spike times, e.g., $T_{lead1}$ and $T_{trail1}$. However, this results in some uncertainty in $T_{sym}$ because the position of the sampling zone beneath the retaining ring is not known.

Referring to FIG. 10, in order to compute the symmetric time $T_{sym}$ in step 132, computer 48 determines the first and last large intensity measurements from sweep path 120, i.e., intensity measurements $I_b$ and $I_i$, and stores the corresponding measurement times $T_{lead}$ and $T_{trail}$. These lead and trail times $T_{lead}$ and $T_{trail}$ are accumulated on each sweep to generate a series of lead times $T_{lead1}, T_{lead2}, \ldots, T_{leadN}$ and trail times $T_{trail1}, T_{trail2}, \ldots, T_{trailN}$. Computer 48 stores lead times $T_{lead1}, T_{lead2}, \ldots, T_{leadN}$ and the associate number of platen rotations 1, 2, ..., N for each leading spike 96. Similarly, computer 48 stores the trail times $T_{trail1}, T_{trail2}, \ldots T_{trailN}$ and the associated number of rotations 1, 2, ..., N of each trailing spike 98. Assuming that platen 24 rotates at a substantially constant rate, the times $T_{lead\ 1}, T_{lead\ 2}, \ldots, T_{leadN}$ form a substantially linear increasing function (shown by line 136). Similarly, the times $T_{trail1}, T_{trail2}, \ldots, T_{trailN}$ also form a substantially linear increasing function (shown by line 137). Computer 48 performs two least square fits to generate two linear functions $T_{lead}(n)$ and $T_{trail}(n)$ as follows:

$$T_{lead}(n)=a_1+(a_2*n)$$

$$T_{trail}(n)=a_3+(a_4*n)$$

where n is the number of platen rotations and $a_1, a_2, a_3$ and $a_4$ are fitting coefficients calculated during the least square fit. Once the fitting coefficients have been calculated, the symmetry time $T_{sym}$ at which laser beam 42 crosses mid-line 124 (shown by phantom line 138) may be calculated as follows:

$$T_{sym} = \frac{a_1+a_3}{2} + \frac{a_2+a_4}{2} \cdot n$$

By using a least square fit over several platen rotations to calculate the symmetry time $T_{sym}$, uncertainty caused by the differences in the relative position of the sampling zone beneath the retaining ring are substantially reduced, thereby significantly reducing uncertainty in the symmetry time $T_{sym}$.

Once computer 48 has calculated the time $T_{sym}$ at which laser beam 42 crosses midline 124, the radial distance $R_a, R_b, \ldots, R_j$ of each sampling zone 122a, 122b, ..., 122j, from the center 126 of the substrate are calculated in step 132. Referring to FIG. 11, the radial position may be calculated as follows:

$$R=\sqrt{d^2+L^2-2dL\cos\theta}$$

where d is the distance between the center of the polishing pad and the center of window 36, L is the distance from the center of the polishing pad to the center of substrate 10, and θ is the angular position of the window. The angular position θ of the window may be calculated as follows:

$$\theta=f_{platen}\cdot 2\pi(T_{measure}-T_{sym})$$

where $f_{platen}$ is the rotational rate of the platen (in rpm). Assuming that the carrier head moves in a sinusoidal pattern, the linear position L of the carrier head may be calculated as follows:

$$L=L_0+A\cdot\cos(\omega\cdot T_{measure})$$

where ω is the sweep frequency, A is the amplitude of the sweep, and $L_0$ is the center position of the carrier sweep.

In another embodiment, position sensor 160 could be used to calculate the time $T_{sym}$ when the window crosses midline 124. Assuming that sensor 160 is positioned opposite carrier head 80, flag 162 would be positioned symmetrically across from transparent window 36. The computer 48 stores both the trigger time $T_{start}$ when the flag interrupts optical beam of the sensor, and the trigger time $T_{end}$ when the flag clears the optical beam. The time $T_{sym}$ may be calculated as the average of $T_{start}$ and $T_{end}$. In yet another embodiment, the platen and carrier head positions could be determined at each sample time $T_a$, $T_b$, ..., $T_h$, from optical encoders connected to the platen drive motor and radial drive motor, respectively.

Once the radial positions $R_a$, $R_b$, ..., $R_m$ of the sampling zones have been calculated, some of the intensity measurement may be disregarded. If the radial position R of a sampling zone is greater than the radius of the substrate, then the intensity measurement for that sampling zone includes mostly radiation reflected by the retaining ring or background reflection from the window or slurry. Therefore, the intensity measurements for any sampling zone that is mostly beneath the retaining ring is ignored. This ensures that spurious intensity measurements are not used in the calculation of the thin film layer thickness.

However, some of the intensity measurements for sampling zones that are partially below the retaining ring will still provide useful data. Since the retaining ring has a generally constant reflectivity, whereas the substrate has a reflectivity that varies sinusoidally as a function of time, the intensity measurements from sampling zones that overlap the substrate edge will still exhibit sinusoidal behavior, although with a reduced amplitude and an increased DC offset. The selection of the radial ranges that are excluded depend on the wafer diameter, platen speed and sampling rate. For example, for a sampling period of 25 millisecond and a platen rotation rate of 63 rmp, the sampling zones within 12 mm of the edge of a 200 mm substrate are not used in the thickness calculation.

After several sweeps of laser beam 42 beneath the substrate, computer 48 accumulates a set of intensity measurements $I_1, I_2, \ldots, I_N$, each associated with a measurement time $T_1, T_2, \ldots, T_N$, and a radial position $R_1, R_2, \ldots, R_N$. Referring to FIG. 12, as the intensity, time, and radial position measurements are accumulated in steps 106 and 108, the time and intensity measurements are sorted into bins in a data structure 140 in step 110. Each bin is associated with a radial range of sampling zones. For example, intensity measurements for sampling zones located up to 2 mm from the center of the substrate may be placed in a first bin 142, intensity measurements made for sampling zones located between 2 and 4 mm from the center of the substrate may be placed in a second bin 144, intensity measurements made for sampling zones located between 4 and 6 mm from the center of the substrate may be placed in a third bin 146, and so on. The exact number of bins and the radial ranges of the bins depend upon the sampling frequency, the lateral sweep profile and the platen rotation rate. In general, the radial range of each bin may be selected or determined experimentally so that a sufficient number of intensity measurements are accumulated in the bin to determine the model function described in step 112. In addition, multiple bins may be used in the thickness calculation, and the calculations of thickness for different radial ranges may use overlapping bins.

Referring to FIG. 13, once the intensity measurements have been sorted into radial ranges, computer 48 may generate a model function (shown by phantom line 150) for each bin. The model function is calculated from the observed intensity measurements (shown by points 152) in the bin. Preferably, this model function is a sinusoidal wave. Specifically, the model function $I(T_{measure})$ may be the following:

$$I(T_{measure}) = k \cdot \frac{I_{max} + I_{min}}{2} + (I_{max} - I_{min}) \cdot \cos\left(\phi + \frac{T_{measure}}{\Delta T} 2\pi\right)$$

where $I_{max}$ and $I_{min}$ are the maximum and minimum amplitudes of the sine wave, $\phi$ is a phase difference, $\Delta T$ is the peak-to-peak period of the sine wave, $T_{measure}$ is the measurement time, and k is an amplitude adjustment coefficient. The maximum amplitude $I_{max}$ and the minimum amplitude $I_{min}$ may be determined by selecting the maximum and minimum intensity measurements from the bin. The amplitude adjustment coefficient k may be set by the user to improve the fitting process, and may have a value of about 0.9. The phase difference $\phi$ and peak-to-peak period $\Delta T$ are fitting coefficients to be optimized in this equation. The model function is fit to the observed intensity measurements, e.g., by a conventional least square fit.

Since the polishing rate can change during the polishing process, the polishing characteristics should be periodically recalculated. For example, the peak-to-peak period $\Delta T$ may be recalculated based on the intensity measurements for each cycle. The peak-to-peak periods may be calculated from intensity measurements in overlapping time periods. For example, a first peak-to-peak period may be calculated from the intensity measurement in the first 60% of the polishing run, and a second peak-to-peak period may be calculated from the intensity measurements in the last 60% of the polishing run. The phase difference $\phi$ is typically calculated only for the first cycle.

Once the fitting coefficients have been determined, computer 48 calculates the initial thickness of the thin film layer, the polishing rate, the amount polished, and the remaining thin film layer thickness. The polishing rate P may be calculated from the following equation:

$$P = \frac{\lambda}{\Delta T \cdot 2n \cos\alpha'}$$

where $\lambda$ is the wavelength of the laser beam, n is the index of refraction of the thin film layer, and $\alpha'$ is the angle of laser beam through the thin film layer, and $\Delta T$ is the most recently calculated peak-to-peak period. The angle of incidence $\alpha'$ may be determined from Snell's law, $n_1 \sin \alpha' = n_2 \sin \alpha$, where $n_1$ is the index of refraction of the thin film layer 14, $n_2$ is the index of refraction of air, and $\alpha$ is the off-vertical angle of laser 44.

The initial thickness $D_{initial}$ of the thin film layer may be calculated from the phase difference $\phi$. The initial thickness $D_{initial}$ will be equal to:

$$D_{initial} = \left(M + \frac{\phi}{2\pi}\right) \cdot \frac{\lambda}{2n \cos\alpha'}$$

where M is an unknown integer. Since the estimated initial thickness $D_{estimate}$ is provided in step 102, a value for M may be selected so that $D_{initial}$ is close to the estimated thickness $D_{estimate}$.

The thickness $D_{removed}$ of material removed from thin film layer 14 may be calculated simply from the polishing time and the most recently calculated polishing rate, i.e., $D_{removed} = P \times T_{measure}$, where P is the average polishing rate. Alternately, the thickness $D_{removed}$ of material removed from thin film layer 14 may be calculated by counting the number of the intensity maxima and adjusting for the amount of material removed since the most recent intensity peak. In particular, the thickness $D_{removed}$ may be given by:

$$D_{removed} = \left(N + \frac{\phi}{2\pi}\right) \cdot \frac{\lambda}{2n\cos\alpha'} + P \cdot (T_{measure} - T_{peak})$$

where N is the number of intensity peaks in the filtered reflectance trace, P is the most recently calculated polishing rate, and $T_{peak}$ is the most recent intensity peak. Alternately, the thickness could be calculated by counting the number or fractional number of intensity cycles:

$$D_{removed} = \left(N' + \frac{\phi'}{2\pi}\right) \cdot \frac{\lambda}{2n\cos\alpha'}$$

where N' is the number of intensity cycles in the filtered reflectance trace, and the fractional number of cycles is included in the phase difference $\phi'$.

The remaining thickness $D_{remaining}$ of the thin film layer is equal to the difference between the initial thickness $D_{initial}$ and the total thickness removed $D_{removed}$, i.e., $D_{remaining} = D_{initial} - D_{removed}$.

The polishing rate and thickness calculations discussed above are performed for each bin, thereby providing thickness measurements at a plurality of radial positions across the surface of the substrate. Graphs of the initial and final thickness of the thin film layer as a function of radius are shown in FIGS. 14A and 14B, respectively. The solid lines in FIGS. 14A and 14B represent off-line measurement performed before and after polishing, respectively. The data point circles in FIGS. 14A and 14B represent calculations (performed after polishing) of the initial and final layer thickness, respectively, and show good correspondence to the off-line measurements.

The thickness profile provides a measurement of the flatness across the substrate to characterizes the effectiveness of the CMP tool and process. In addition, in step 116 the computer may calculate various measures of polishing uniformity for tool and process qualification. For example, the computer can determine a within wafer non-uniformity (WIWNU), i.e., the standard deviation in the thicknesses removed divided by the average thickness removed, multiplied by 100%. The computer can also determine the substrate thickness range, i.e., the difference between the maximum thickness and the minimum thickness removed.

The thickness information of the substrate may also be used to determine the polishing endpoint criteria and to control the polishing parameters in order to improve polishing uniformity. For example, if the in situ thickness measurement indicates that the center of the substrate is underpolished, the pressure applied to the carrier head to the center of the substrate may be increased to improve polishing uniformity.

Although this process has been described for polishing of blank substrates for tool and process qualification, it may be possible to perform the thickness measurements during polishing of patterned device substrates. However, the reflectivity traces generated from device substrates typically are not smooth sinusoidal functions, and therefore would require more complex pattern recognition algorithms, e.g., as described in U.S. patent application Ser. No. 08/962,085, entitled METHOD AND APPARATUS FOR MODELING SUBSTRATE REFLECTIVITY DURING CHEMICAL MECHANICAL POLISHING, by Andreas Wiswesser, filed Oct. 31, 1997, and assigned to the assignee of the present invention, the entire disclosure of which is incorporated herein by reference. The thickness measurements could be used to provide dynamic control of the polishing parameters and to detect a polishing endpoint.

The present invention has been described in terms of a preferred embodiment. The invention, however, is not limited to the embodiment depicted and described. Rather, the scope of the invention is defined by the appended claims.

What is claimed is:

1. A chemical mechanical polishing apparatus, comprising:

a movable polishing surface;

a carrier head for holding a substrate having a layer thereon in contact with the polishing pad;

a light source to direct a light beam through the polishing surface, the motion of the light source relative to the substrate causing the light beam to move in a path across the substrate surface;

a detector to monitor an interference signal produced by the light beam reflecting off the substrate;

a computer configured to extract a plurality of intensity measurements from the interference signal, each intensity measurement corresponding to a sampling zone in the path across the substrate surface, determine a radial position on the substrate for each sampling zone, divide the intensity measurements into a plurality of radial ranges according to the radial positions, and compute a characteristic of the substrate layer for each radial range from the intensity measurements associated with that radial range.

2. The apparatus of claim 1, wherein the characteristic is a polishing rate.

3. The apparatus of claim 1, wherein the characteristic is an initial thickness of the substrate layer.

4. The apparatus of claim 1, wherein the polishing characteristic is the difference between an initial thickness and a final thickness of the substrate layer.

5. The apparatus of claim 1, wherein the characteristic is a remaining thickness of the substrate layer.

6. The apparatus of claim 1, wherein the computer is configured to calculate a measure of polishing uniformity from the measured characteristic in each radial range.

7. The apparatus of claim 1, wherein the carrier head includes a retaining ring with a reflective lower surface.

8. The apparatus of claim 1, further comprising a position sensor which monitors the position of the polishing pad.

9. The apparatus of claim 1, further comprising a position sensor which monitors the position of the carrier head.

10. The apparatus of claim 1, wherein the polishing surface includes a polishing pad mounted on a platen.

11. The apparatus of claim 1, wherein the polishing surface includes a window, and the light beam passes through the window.

12. A chemical mechanical polishing apparatus, comprising:

a movable polishing surface;

a carrier head for holding a substrate having a layer thereon in contact with the polishing pad;

a light source to direct a light beam through the polishing surface, the motion of the light source relative to the substrate causing the light beam to move in a path across the substrate surface;

a detector to monitor an interference signal produced by the light beam reflecting off the substrate;

a computer configured to extract a plurality of intensity measurements from the interference signal, each intensity measurement corresponding to a sampling zone in the path across the substrate surface, assign each of the intensity measurements a radial position on the substrate, divide the intensity measurements into a plurality of radial ranges according to the radial positions, and determine a polishing endpoint from the intensity measurements in at least one radial range.

13. The apparatus of claim 12, wherein the computer is further configured to determine when the light beam crosses a midline of the substrate.

14. The apparatus of claim 13, wherein the computer is further configured to assign the radial positions based on a difference between times of the measurements and the time the light beam crosses a midline of the substrate.

15. The apparatus of claim 14, wherein the computer is further configured to determine a position of the carrier head.

16. The apparatus of claim 15, wherein the computer is further configured to assign the radial positions based on the position of the carrier head.

17. A chemical mechanical polishing apparatus, comprising:

a movable polishing surface;

a carrier head for holding a substrate having a layer thereon in contact with the polishing pad;

a light source to direct a light beam through the polishing surface, motion of the light source relative to the substrate causing the light beam to move in a path across the substrate surface;

a detector to monitor an interference signal produced by the light beam reflecting off the substrate;

a computer configured to extract a plurality of intensity measurements from the interference signal, each intensity measurement corresponding to a sampling zone in the path across the substrate surface, determine a time that the light beam crosses a midline of the substrate, assign each of the intensity measurements a position based on a difference between times at which the intensity measurements were made and the time that the light beam crosses the midline of the substrate, divide the intensity measurements into a plurality of sets according to the positions, and determine a polishing endpoint from at least one set of intensity measurements.

* * * * *